US009901803B1

(12) United States Patent
Dardenne

(10) Patent No.: US 9,901,803 B1
(45) Date of Patent: Feb. 27, 2018

(54) GOLF ALIGNMENT TOOL

(71) Applicant: Geoffroy Dardenne, Parcieux (FR)

(72) Inventor: Geoffroy Dardenne, Parcieux (FR)

(*) Notice: Subject to any disclaimer, the term of this patent is extended or adjusted under 35 U.S.C. 154(b) by 0 days.

(21) Appl. No.: 15/665,512

(22) Filed: Aug. 1, 2017

(51) Int. Cl.
 *A63B 69/36*    (2006.01)
 *G09B 19/00*    (2006.01)
 *A63B 69/00*    (2006.01)
 *A63B 57/00*    (2015.01)

(52) U.S. Cl.
 CPC ...... *A63B 69/3667* (2013.01); *G09B 19/0038* (2013.01); *A63B 57/00* (2013.01); *A63B 69/00* (2013.01); *A63B 2209/08* (2013.01)

(58) Field of Classification Search
 USPC ................ 473/240, 257, 260, 264, 266, 267
 See application file for complete search history.

(56) References Cited

U.S. PATENT DOCUMENTS

| | | | | | |
|---|---|---|---|---|---|
| 5,913,732 | A | * | 6/1999 | Kwakkel | A63B 69/3676 473/240 |
| 6,048,273 | A | * | 4/2000 | Clement | A63B 69/3676 273/DIG. 21 |
| 2005/0181885 | A1 | * | 8/2005 | Yamanaka | A63B 69/3641 473/257 |
| 2006/0100037 | A1 | * | 5/2006 | Pels | A63B 57/12 473/387 |
| 2009/0088266 | A1 | * | 4/2009 | McInerney | A63B 21/153 473/226 |
| 2014/0221136 | A1 | * | 8/2014 | Forutanpour | A63B 59/00 473/569 |

* cited by examiner

*Primary Examiner* — Nini Legesse

(57) ABSTRACT

A golf alignment tool, comprising a whole alignment unit comprised of a first component half and a second component half, magnets embedded within the perimeters of each of the component halves, the magnets oriented and positioned to removably fasten the component halves together into the whole alignment unit, a spring return reel mounted within each of the component halves, each spring return reel carrying a variable portion of an elongated line whose ends are permanently attached to one of each of the spring return reels, the elongated line extending from an upper portion of each the component halves, and a support mounted on each of the component halves.

10 Claims, 5 Drawing Sheets

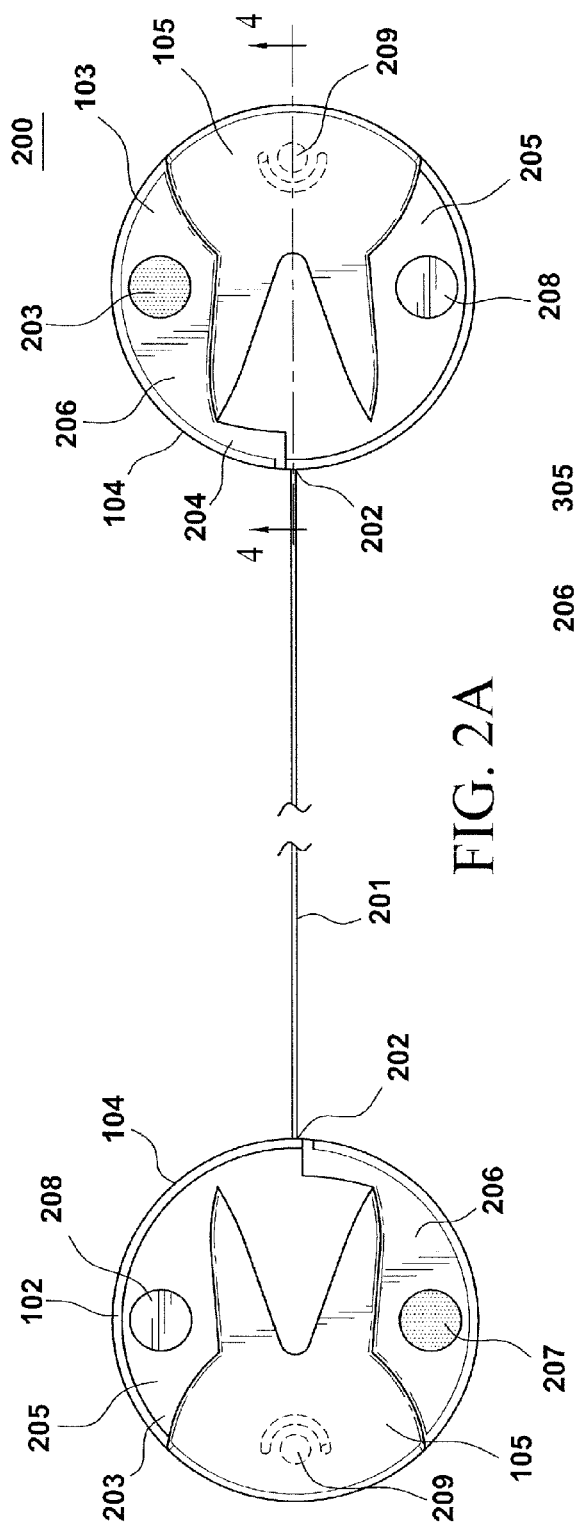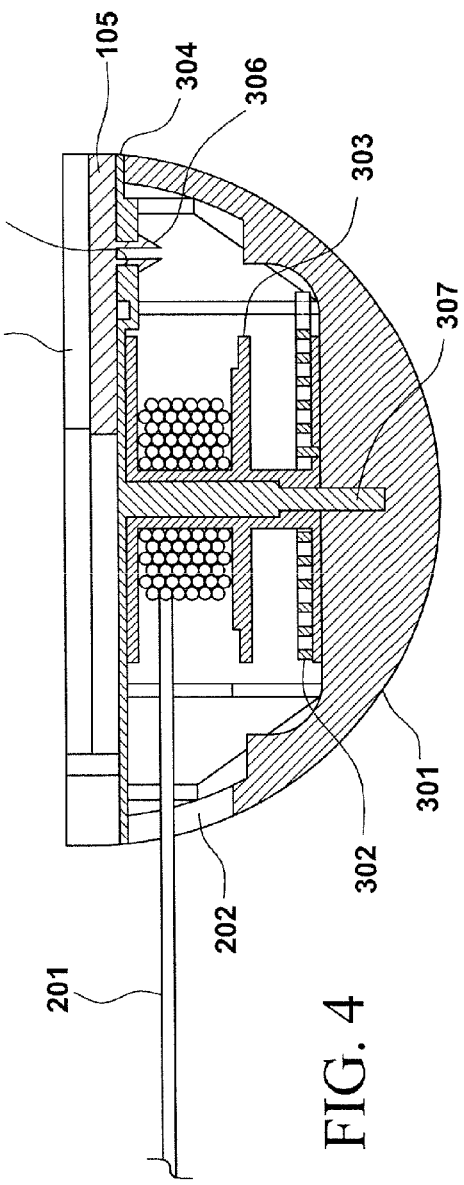

GOLF ALIGNMENT TOOL

FIELD OF THE INVENTION

This disclosure relates generally to a golf alignment tool used for alignment of varying types of golf swings.

BACKGROUND

One of the key fundamentals in the game of golf is being able to identify the target line. The target line is the imaginary line between the golf ball and the desired target. In a basic setup posture, a golfer's feet, knees, hips, and shoulders should be lined up parallel to this line. It is crucial that a golfer be able to visualize this line in order to achieve the proper setup.

BRIEF SUMMARY

In an effort to address the above-described needs, the present application discloses a golf alignment tool, comprising a whole alignment unit comprised of a first component half and a second component half, magnets embedded within the perimeters of each of the component halves, the magnets oriented and positioned to removably fasten the component halves together into the whole alignment unit, a spring return reel mounted within each of the component halves, each spring return reel carrying a variable portion of an elongated line whose ends are permanently attached to one of each of the spring return reels, the elongated line extending from an upper portion of each the component halves, and a support mounted on each of the component halves, each support capable of transitioning between a closed position in which the support is fully encased within the whole alignment unit and an open position in which the support extends outward beyond the perimeter of the component halves at a position at a bottom portion of the component halves opposite the upper portion.

The disclosed embodiments provide the use of a string that makes putting and driving easier allowing the golfer to be placed in a successful situation and help improve confidence. The disclose embodiment achieves these goals with a device having small footprint that allows the disclosed embodiment to fits inside a golfer's pocket.

BRIEF DESCRIPTION OF THE DRAWINGS

This disclosure is further described in the detailed description that follows, with reference to the drawings, in which:

FIG. 2A is a perspective view of the two component halves comprising the golf alignment tool with the supports in a closed position according to the disclosed embodiment.

FIG. 4 is a cross sectional view of a component half according to the disclosed embodiment.

DETAILED DESCRIPTION

An exemplary embodiment of a golf alignment tool is disclosed. As required, detailed embodiments of the disclosed device are disclosed herein however, it is to be understood that the disclosed embodiments are merely exemplary of the invention which may be embodied in various and alternative forms. The figures are not necessarily to scale and some features may be exaggerated or minimized to show details of particular components. Therefore, the structural and functional details disclosed herein are not to be interpreted as limiting, but merely as representative for teaching a person of ordinary skill in the art to variously employ the present disclosure.

Figure 1:
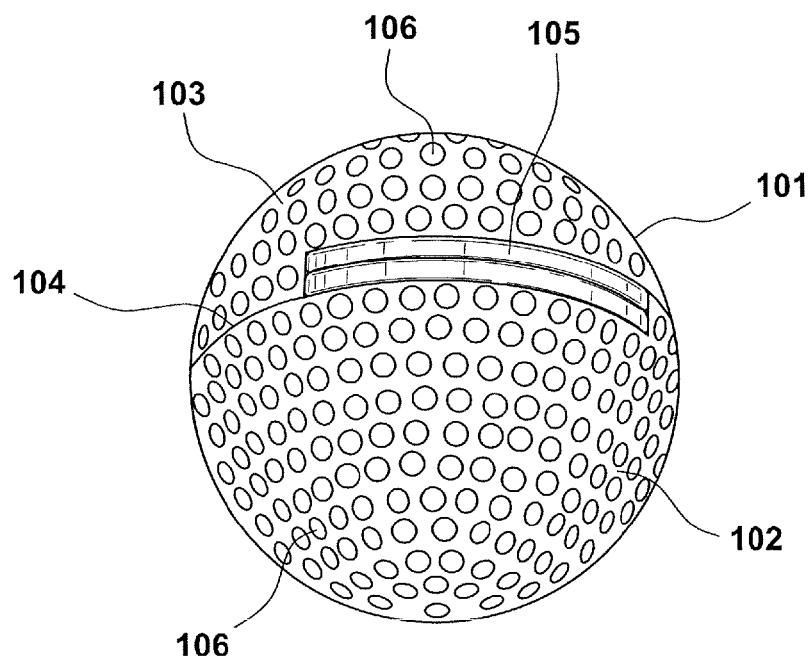
FIG. 1 is a perspective view of a golf alignment tool according to a disclosed embodiment.

In FIG. 1, a perspective view of a golf alignment tool according to a disclosed embodiment is shown. As shown in FIG. 1, the golf alignment tool 100 is comprised of a first component half 102 and a second component half 103 which together form a whole alignment unit 101 when joined. In the disclosed embodiment, the first and second component halves 102, 102, are shown as spherical halves which, when joined form a whole alignment unit 101 shown as a proportional sphere. However, the component halves may be formed in other shapes and sizes while still remaining within the scope of the present disclosure, these shapes including, but not limited to, square component halves which form a cube when joined and triangular component halves which form a pyramid when joined. Moreover, each of the first and second component halves 102, 103 may have similar or different proportions and dimensions while still remaining within the scope of the present disclosure.

The first and second component halves 102, 103 are joined along their respective perimeters 104 using magnets (not shown) embedded within the respective perimeters 104 of each of the first and second component halves 102, 103.

The outer surface 106 of the first and second component halves 102, 103 may be textured or dimpled in some fashion. In the disclosed embodiment, the outer surface 106 is shown as dimpled in a manner similar to that of a standard golf ball. However, other types of textures may be applied to the outer surface 106 of the component halves 102, 103 while remaining within the scope of the present disclosure.

Each of the first and second component halves 102, 103 also include a support 105 that transitions between an open position and closed position. Each support 105 being fully contained within the golf alignment tool 100 and bordering the perimeter 104 of each component half 102, 103 when in the closed position.

In FIG. 2A, a perspective view of the two component halves comprising the golf alignment tool with the supports in a closed position according to the disclosed embodiment is shown. As shown in FIG. 2A, the first component half 102 includes a first inside face plate 203 mounted on the perimeter 104 of the first component half 102, the first inside face plate 203 fully enclosing the space within the first component half 102. Similarly, the second component half 103 includes a second inside face plate 204 mounted on the perimeter 104 of the second component half 102, the second inside face plate 204 fully enclosing the space within the second component half 103.

A support 105 is pivotally attached to an outer surface of each of the first and second inner faceplates 203, 204 at a connection point 209 near their respective perimeters 104.

Each support 105 sitting fully against the outer surface when in the closed position and extending beyond the perimeter 104 the perimeter when in the open position. The supports 105 are shaped to resemble a golf tee having one or more spiked ends, each support 105 capable of supporting a component half 102, 103 when in the open position and with the one or more spiked ends inserted into the ground of a golf green.

Each of the first and second inside face plates 203, 204 includes an access hole 202 through which an elongated line 201 is passed out from within the enclosed space of each of the component halves 102, 103. Each end of the elongated line 201 is permanently and retractably attached to one of the component halves 102, 103. The access holes 202 are each positioned adjacent to the perimeter 104 directly opposite the respective connection point 209 of the supports 105.

Each of the first and second inside face plates 203, 204 also includes a raised portion 206 on one side of the support 105 and adjacent to a flat portion 205. The inside edged of the raised portion 206 is shaped to partially follow the side perimeter of the support 105. The outside edge of the raised portion 206 follows the perimeter 104 of the component half 102, 103.

The height of the raised portion 206 is at least twice the height a single support 105. The raised portions 206 are positioned and oriented on each of the first and second inside face plates 203, 204 such that the raised portion 206 on the first inside face plate 203 fits within the flat potion 205 of the second inside face plate 204 when the two component halves 102, 103 are joined and aligned such that the supports 105 overlap each other while in the closed position.

The inside face plates 203, 204 may also include alignment keys 207, 208. Specifically, the raised portion 206 of the first inside face plate 203 may also include a raised key element 207 that is complementary with a depressed key element 208 on the flat portion 205 of the second inside face plate 204. Similarly, the raised portion 206 of the second inside face plate 204 may also include a raised key element 207 that is complementary with a depressed key element 208 on the flat portion 205 of the first inside face plate 203.

Figure 2B:
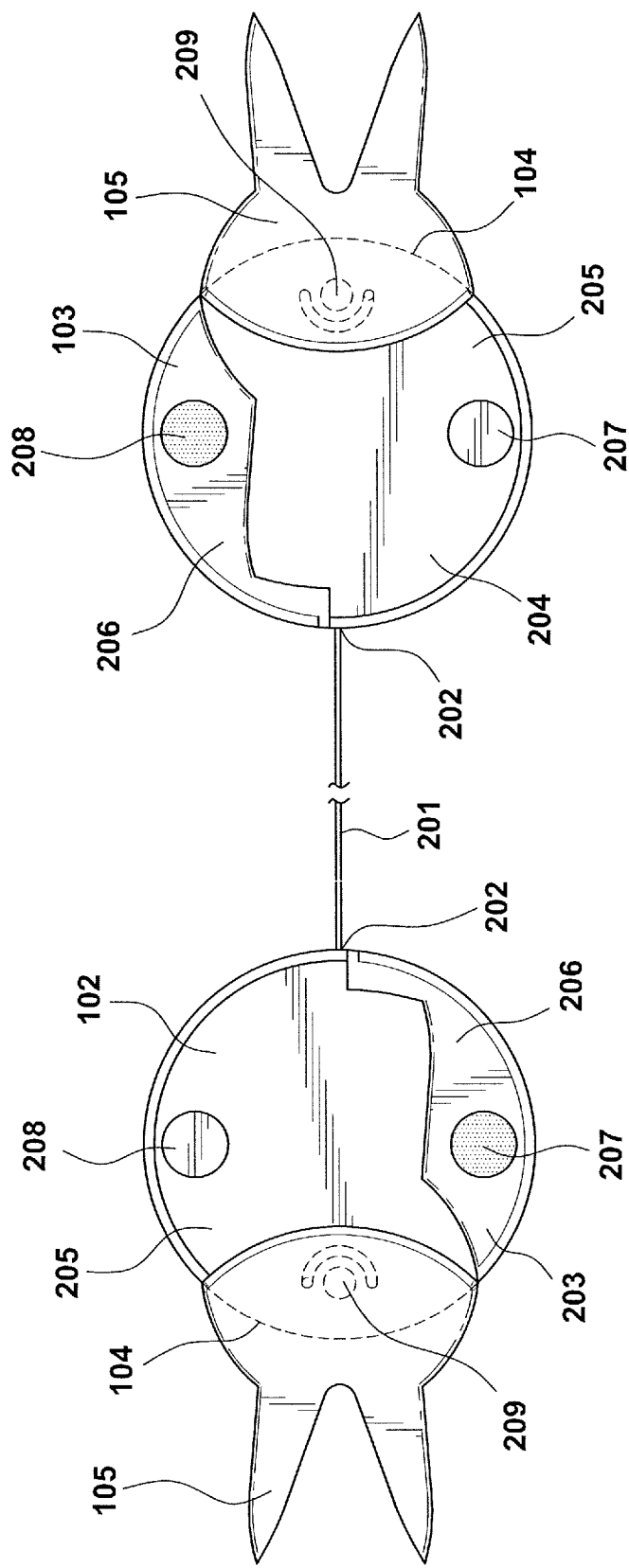
FIG. 2B is a perspective view of the two component halves comprising the golf alignment tool with the supports in an open position according to the disclosed embodiment.

In FIG. 2B, a perspective view of the two component halves with the supports in an open position according to the disclosed embodiment is shown. As shown in FIG. 2B, in the open position, the supports 105 extend beyond the perimeters 104 of each of the component halves 103, 104. The supports 105 transition from the closed position to the open position by rotating away from an adjacent raised portion 206 on the inside face plates 203, 204. Similarly, the supports 105 transition from the open position to the closed position by rotating towards the adjacent raised portion 206 on the inside face plates 203, 204. The supports 105 rotate about a connection point 209 located on the upper surface of the inside face plates 203, 204 and positioned near the perimeter 104.

The supports 105 include an upper portion and a lower portion. The lower portion of each of the supports 105 is comprised of one or more spiked ends that are inserted into the ground in order to support the corresponding component half 102, 103 in an upright position above the surface of a golf green. The upper portion of each of the supports 105 sits above the surface of the golf green thereby elevating the corresponding component half 102, 103 above the surface of the golf green. The upper portions of the supports 105 elevate the spherical halves 102, 103 a sufficient amount as to allow for the swinging of a golf club head directly under the elongated line 201 that is extended between the component halves 102, 103.

Figure 3:
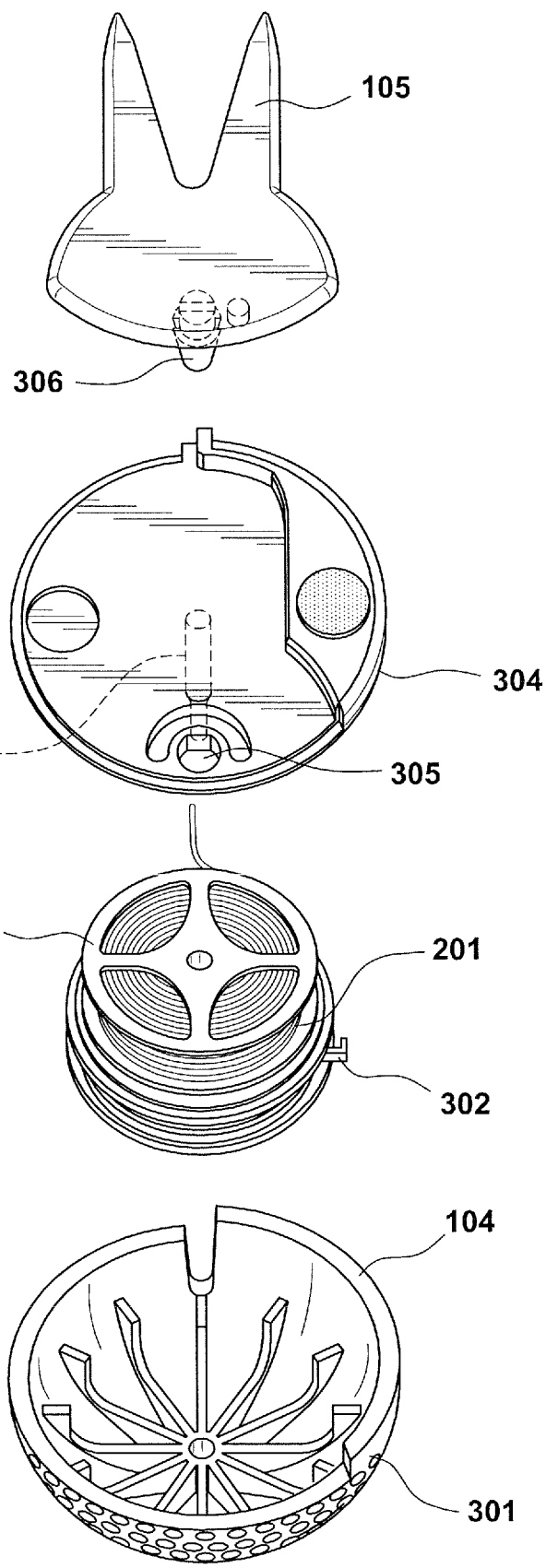
FIG. 3 is an exploded view of a component half according to the disclosed embodiment.

In FIG. 3, an exploded view of a component half according to the disclosed embodiment is shown. As shown in FIG. 3, a spherical half 300 includes an outer shell 301, a spring return reel 303, a spring component 302, and an inner face plate component 304.

The outer shell 301 is shown as spherical shaped with an outer surface that is textured and dimpled to resemble a standard golf ball. However, as discussed above, the outer shell 301 may take on other shapes, sizes, and dimension while till remaining within the scope of the disclosed embodiment.

Inner face plate component 304 includes a spindle 307 extending downward from its lower surface. The inner face plate 304 is secured along the perimeter 104 of the outer shell 301 with the spindle 307 facing downward and into the inner space defined by the outer shell 301.

The spring return reel 303 is mounted onto and rotates about the spindle 307 to release and retract the elongated line 201, each end of the elongated line 201 permanently attached a spring return reel 303 in each of the spherical halves 102, 103.

The spring component 302 mounts onto the end of the spindle 307 and connects directly to the mounted spring return reel 303 to enable the spring biased release and retraction of the elongated line 201 within each of the component halves 102, 103.

The spherical half 300 further includes a support 105 with a connection point 306 that is mounted to a corresponding connection point 305 on the outer surface of the inner face plate component 304. The support connection points 306 and the inner face component connection points 305 interact to allow the support 105 to rotate between the closed position and the open position. While the disclosed embodiment describes connection points that allow the supports to rotate between the closed and open positions, a person on ordinary skill in the art will realize that other types of connection point may be implemented while remaining within the scope of the present disclosure, including connection points that allow the supports to slide between the open and closed positions.

In FIG. 4, a cross section view of a component half is shown according to the present disclosure. As shown in FIG. 4, the spring return reel 303 in mounted onto the spindle 307 extending downward from the lower surface of the inner face component 304. The spring component 302 is mounted to the end of the spindle 307 is attached to the spring return reel 303 as to provide for the spring biased rotation of the spring return reel 303 about the spindle 307. The inner face plate 304 is secured along the perimeter 104 of the outer shell 301 and secures the spring loaded reel 303 and the spring component 302 within the inner space defined by the component half 300. The support connection point 306 is attached to the inner face component connection points 305 thereby allowing the support 105 to rotate between the closed and open positions.

Figure 5:
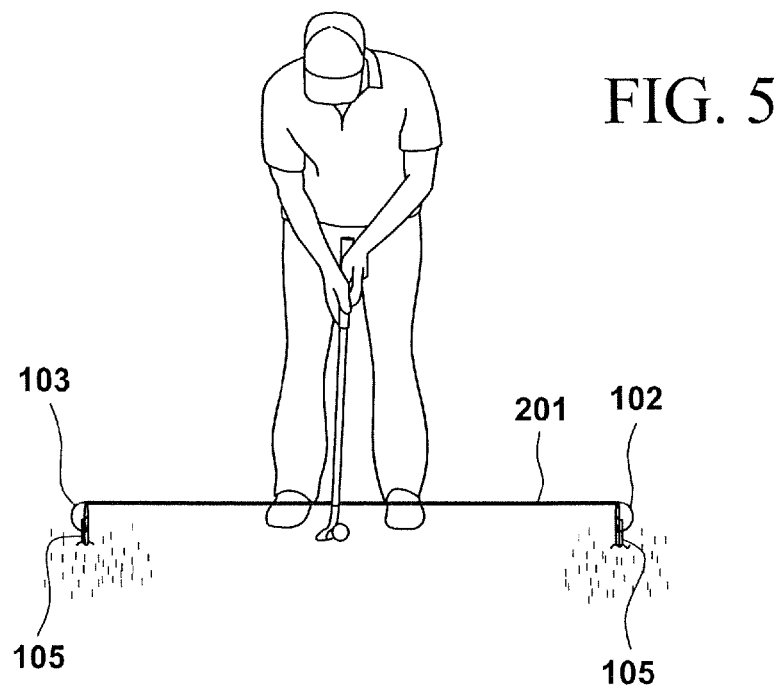
FIG. 5 is a perspective view showing the use of the golf alignment tool on a putting green according to the disclosed embodiment.

In FIG. 5, a perspective view showing the use of the golf alignment tool on a putting green according to the disclosed embodiment is shown. As shown in FIG. 5, to use the golf alignment tool on a putting green, the component halves 102, 103 are separated and the supports 105 are transitioned to the open position. The lower portion of each support 105 is inserted into the ground at separate positions on the putting green with the elongated line 201 running between the two component halves 102, 103. A golfer is then able to practice putting by swinging the golf club head directly under the elongated string and thereby using the elongated string 201 as a guide.

Figure 6:
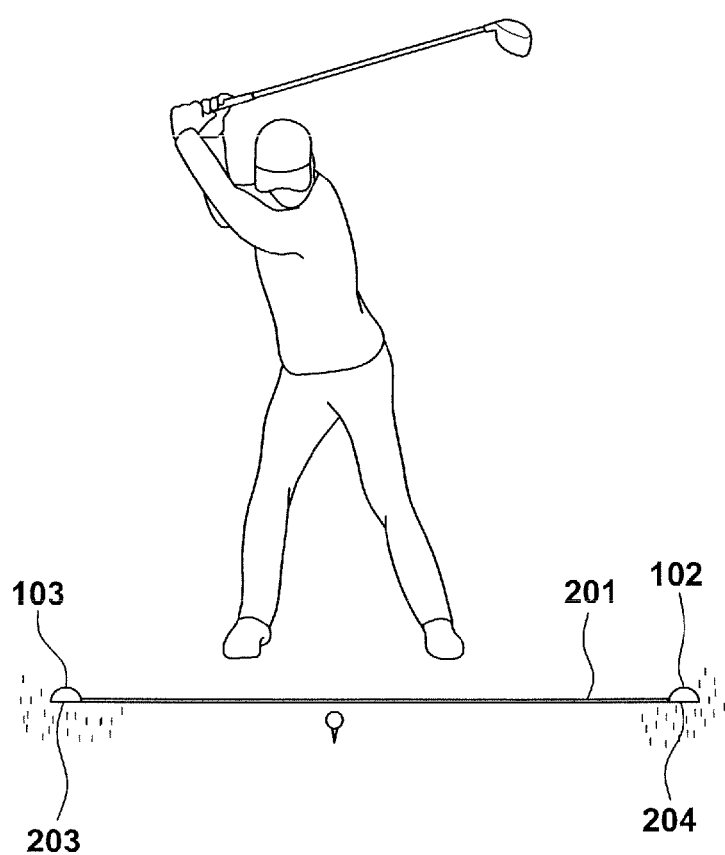
FIG. 6 is a perspective view showing the use of the golf alignment tool on a driving range according to the disclosed embodiment.

In FIG. 6, a perspective view showing the use of the golf alignment tool on a driving range according to the disclosed embodiment is shown. As shown in FIG. 6, to use the golf alignment tool on a driving range, the component halves 102, 103 are separated and the supports 105 left in the closed position. The inside face plate 203, 204 of each component half 102, 103 is position flat on the ground at separate positions on the driving green with the elongated line 201 running between the two component halves 102, 103. The golfer is then able to practice driving by swinging the golf club alongside the elongate line 201 and thereby using the elongated line 201 as a guide.

What is claimed:

1. A golf alignment tool, comprising:
   a whole alignment unit comprised of a first component half and a second component half;
   magnets embedded within the perimeters of each of the component halves, the magnets oriented and positioned to removably fasten the component halves together into the whole alignment unit;
   a spring return reel mounted within each of the component halves, each spring return reel carrying a variable portion of an elongated line whose ends are permanently attached to one of each of the spring return reels, the elongated line extending from an upper portion of each the component halves; and
   a support mounted on each of the component halves, each support capable of transitioning between a closed position in which the support is fully encased within the whole alignment unit and an open position in which the support extends outward beyond the perimeter of the component halves at a position at a bottom portion of the component halves opposite the upper portion.

2. The golf alignment tool of claim 1 wherein the supports include a lower portion with at least a single spike for insertion into the ground of a golf green to support the component halves at two disparate positions with the elongated line extended between the two disparate positions.

3. The golf alignment tool of claim 1 wherein the supports rotate about a connection point adjacent to the perimeter of the component halves in order to transition between the closed and open positions.

4. The golf alignment tool of claim 1 wherein the supports slide along connection point adjacent to the perimeter of the component halves in order to transition between the closed and open positions.

5. The golf alignment tool of claim 1 wherein the supports include an upper portion and a lower portion, the upper portion providing that when the lower portion is inserted into a golf green, there is a sufficient distance between the ground and the elongated string extending between the spherical halves to allow for putting directly under the elongated string.

6. The golf alignment tool of claim 1 further comprising an inner face plate enclosing each of the component halves along the perimeter, the inner face plates each including a flat portion and a raised portion.

7. The golf alignment tool of claim 1 wherein the magnets are distributed evenly along the perimeters of the component halves.

8. The golf alignment tool of claim 1 wherein each component half is spherical shaped with similar proportions and shape such that the whole alignment unit is a spherical ball.

9. The golf alignment tool of claim 8 wherein the diameter of each component half is no more than 8 centimeters.

10. The golf alignment tool of claim 8 wherein an outer surface of each component half is textured or dimpled such as to resemble a golf ball.

* * * * *